United States Patent Office 2,830,979
Patented Apr. 15, 1958

2,830,979

BROWN TETRAKISAZO DYESTUFF AND ITS HEAVY METAL COMPLEX COMPOUNDS

Hermann Goebel and Eugen Glietenberg, Leverkusen-Bayerwerk, Germany, assignors to Farbenfabriken Bayer Aktiengesellschaft, Leverkusen, Germany, a corporation of Germany No Drawing. Application January 26, 1955
Serial No. 484,293

Claims priority, application Germany February 13, 1954

3 Claims. (Cl. 260—145)

The present invention relates to a new tetrakisazo dyestuff and to its heavy metal complex compounds.

The new tetrakisazo dyestuff corresponds to the following formula

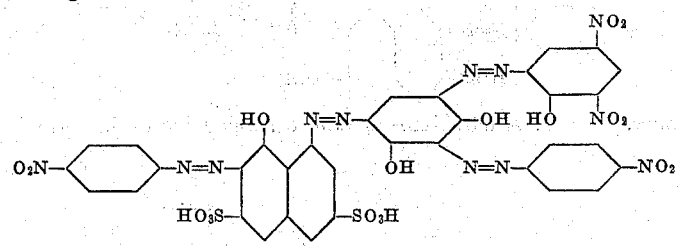

This new dyestuff may be obtained by coupling in about molar quantities diazotized 1-amino-8-hydroxynaphthalene-3,6-disulfonic acid with 1,3-dihydroxy-benzene in alkaline medium, further coupling this monoazo dyestuff with diazotized 4,6-dinitro-2-amino-1-hydroxybenzene in weakly alkaline medium, and finally coupling the disazo dyestuff with two mols of diazotized 4-nitro-1-aminobenzene in weakly acid medium. It is, however, possible to make this tetrakisazo dyestuff also by coupling diazotized 4-nitro-1-aminobenzene with 1-amino-8-hydroxynaphthalene-3,6-disulfonic acid in alkaline or acetic acid medium, diazotizing the monoazo dyestuff and coupling the diazo compound with 1,3-dihydroxybenzene in alkaline medium, further coupling this disazo dyestuff with diazotized 4,6-dinitro-2-amino-1-hydroxybenzene in weakly alkaline medium, and finally coupling the trisazo dyestuff again with diazotized 4-nitro-1-aminobenzene in weakly acid medium.

The new dyestuff is especially suited for dyeing chrome tanned upper, chrome velvet as well as leather tanned with vegetable tannins and synthetic tanning agents. It yields on these kinds of leather very bright and full brown shades of good conformity of the shades. Besides the good solubility of the dyestuff, the deep bloomy brown shades it yields on velvet leather, and its good levelling power are particularly to be mentioned. Also its improved fastness to buffing is to be pointed out in which property it excels the trisazo dyestuff known from Swiss Patent No. 116,360 by coupling diazotized 4,6-dinitro-2-amino-1-hydroxybenzene with 1,3-dihydroxybenzene in alkaline medium, coupling the monoazo dyestuff with diazotized 1-amino-8-hydroxynaphthalene-3,6-disulfonic acid and finally coupling this diazo dyestuff with diazotized 4-nitro-1-aminobenzene in acetic acid medium, the components being used in molar proportions.

The new dyestuff is further distinguished by a very good fastness to acids and formaldehyde. Its fastness to the hardness of water is also good.

Since the new dyestuff contains a group of two hydroxy radicals in o-position to an azo bridge it can be treated in usual manner with agents yielding metal. Of the various heavy metal complex compounds thus obtainable the iron complex compound proved to be a particularly valuable brown leather dyestuff the shade of which is more yellowish and which is particularly distinguished by a good fastness to water and washing.

These many good properties of the new tetrakisazo dyestuff and its metal complex compounds amount to a very valuable advance in the field of the brown leather dyestuffs.

The following examples illustrate the invention, the parts being by weight:

Example 1

The monoazo dyestuff prepared in known manner from 341 parts of diazotized 1-amino-8-hydroxynaphthalene-3,6-disulfonic acid (monosodium salt) and 110 parts of 1,3-dihydroxybenzene by coupling in soda alkaline medium is coupled in the presence of sodium carbonate with the diazo compound of 220 parts of 4,6-dinitro-2-amino-1-hydroxybenzene. After the coupling is finished, the neutralized dyestuff solution is coupled at a temperature of 10° C. with the diazo solution of 276 parts of 4-nitro-1-aminobenzene which has been rendered neutral to Congo-red paper and clarified. After the coupling is complete, the tetrakisazo dyestuff is isolated from weakly acid medium by adding sodium chloride and dried. When ground, it represents a black-brown powder which dyes chrome-, vegetable- and synthetic-tanned leather in deep and full brown shades of very good fastness to acid, formaldehyde and solvents, as well as of good fastness to the hardness of water and to light.

By converting the isolated dyestuff in known manner into its iron complex compound, a more yellowish dyestuff is obtained which excels the metalfree dyestuff by its improved, very good fastness to water and washing.

Example 2

A diazotized and clarified solution of 152 parts of 4-nitro-1-aminobenzene is coupled at low temperature in the presence of sodium carbonate with 341 parts of 1-amino-8-hydroxynaphthalene-3,6-disulfonic acid (monosodium salt). After the coupling is finished, hydrochloric acid is added whereupon the aminoazo dyestuff is further diazotized in known manner and coupled at 0–5° C. in the presence of sodium carbonate with 110 parts of 1,3-dihydroxybenzene, dissolved in 2000 parts of water and 125 parts of a 30 percent caustic soda solution. 280 parts of 4,6-dinitro-2-amino-1-hydroxybenzene are diazotized in known manner and are coupled as an acetic acid solution with the disazo dyestuff in weakly alkaline medium. After this coupling is complete, the reaction product is coupled with the diazo solution of 83 parts of 4-nitro-1-aminobenzene which has been clarified and rendered neutral to Congo-red paper; after one hour a 20 percent sodium carbonate solution is allowed to run in until the final pH value is 8.5. Thereafter, sodium chloride is added and the tetrakisazo dyestuff is filtered at litmus acid reaction. After it has been dried and ground, the dyestff represents a black-brown powder which is particularly suited for the dyeing of chrome upper, chrome velvet as well as of vegetable- and synthetic-tanned leather. The dyeings on velvet are particularly to be mentioned because of their deep, bloomy violet-brown shades showing very good fastness to buffing.

The fastness to acid, formaldehyde as well as to solvents is very good, the fastness to the hardness of water and to light is good.

By converting in known manner the isolated dyestuff into its iron complex compound, a more yellowish dyestuff is obtained which excels the metal-free dyestuff by its improved, very good fastness to washing and water.

We claim:
1. A dyestuff selected from the group consisting of the tetrakisazo dyestuff corresponding as free acid to the formula

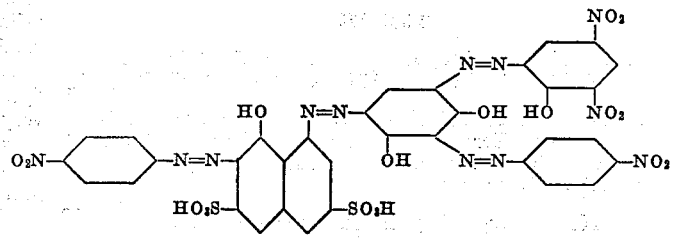

and its iron complex compounds.

2. The iron complex compound of the tetrakisazo dyestuff corresponding as free acid to the formula

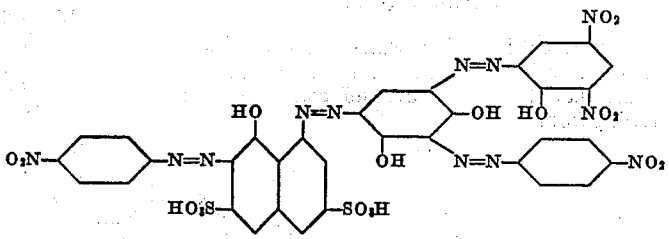

3. A tetrakisazo dyestuff corresponding to the formula

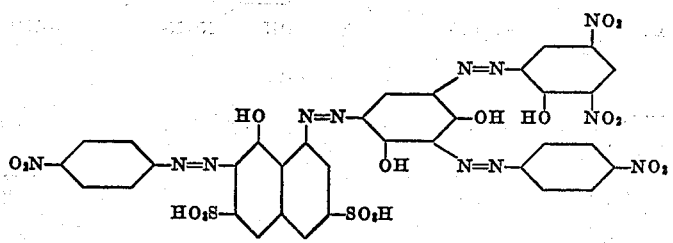

References Cited in the file of this patent

UNITED STATES PATENTS

| | | |
|---|---|---|
| Re. 22,046 | Fellmer | Mar. 10, 1942 |
| 1,697,122 | Krech et al. | Jan. 1, 1929 |
| 2,139,472 | Schubert | Dec. 6, 1938 |

FOREIGN PATENTS

| | | |
|---|---|---|
| 116,360 | Switzerland | Aug. 16, 1926 |